G. A. SCHETTLER.
MACHINE FOR MEASURING THE SUPERFICIAL AREA OF LEATHER AND LIKE MATERIAL.
APPLICATION FILED AUG. 9, 1910.

1,046,655.

Patented Dec. 10, 1912.

Witnesses:—

Inventor:
Gustav Adolf Schettler
Jas. H. Churchill
Atty.

UNITED STATES PATENT OFFICE.

GUSTAV ADOLF SCHETTLER, OF LEICESTER, ENGLAND.

MACHINE FOR MEASURING THE SUPERFICIAL AREA OF LEATHER AND LIKE MATERIAL.

1,046,655.

Specification of Letters Patent.  Patented Dec. 10, 1912.

Application filed August 9, 1910. Serial No. 576,313.

*To all whom it may concern:*

Be it known that I, GUSTAV ADOLF SCHETTLER, a subject of the Emperor of Germany, a citizen of Leicester, England, residing at Leicester, in the county of Leicester, England, have invented new and useful Improvements in or Relating to Machines for Measuring the Superficial Area of Leather and Like Material, of which the following is a specification.

This invention relates to machines for measuring the superficial area of material such for example as leather, cloth, paper and the like.

The invention is an improvement in area-measuring machines of the "Sawyer" type and its object is to obviate several of the well known disadvantages attendant with machines of this class and to provide measuring mechanism which will be capable of accurately measuring from the thinnest to the thickest of material without requiring adjustment.

The improved measuring mechanism and other improved features according to this invention will be hereinafter fully described.

Various modifications of the measuring mechanism in machines of the "Sawyer" type are already known, for example, the measuring wheels have been combined with a grooved transport roller with which has been employed a series of endless bands to conduct the material under the measuring wheels which were supported clear of the transport roller but on a level with its surface and remained stationary until the material passed under them. In this case the measuring wheel pinions and their segments were constantly in engagement and the segments were carried by pivoted levers so that they could rise in company with the measuring wheels when the latter were lifted by the introduction of the material thereunder. It has been found however that the introduction of a thick material under the measuring wheels made contact with them sooner than a thin material would and consequently said measuring wheels were rotated for a longer period during the passage of thick material thereunder than they were during the passage of a thin material. On this account inaccurate measurement resulted and said mechanism has been found to be incapable of measuring both thick and thin material without adjustment. Again, in the mechanism just referred to and also in other arrangements of measuring mechanism where segmental racks carried by pivoted arms or levers have been adapted to receive rotary movement from the measuring wheels, the connecting means between the segments and the integrating system of levers have been attached to the hubs of the segments with the result that when the segments have been raised or lowered the relationship between the fulcrums of the segments and the integrating system of levers has been altered and consequently the indication of the area has not corresponded with the amount of area actually measured by the measuring wheels. An area-measuring machine has also been proposed wherein a series of measuring wheels have been employed in combination with a plain *i. e.* ungrooved transport roller and a series of braking devices have been combined with the measuring wheels to permit an amount of back or return movement proportionate to the thickness of the material being measured so that adjustment for different thicknesses of material has not been necessary. In this machine however the measuring wheels required to be normally held clear of the transport roller and thus it was not possible to effect the very fine adjustment necessary to enable the machine to deal with extremely thin material. I am also aware that it has been proposed to construct an area-measuring machine having a grooved transport or feed roller combined with which have been arranged a series of electrical contact devices adapted to actuate an indicator as the material has passed over the roller, but I do not make any claim to a machine of this character.

The present invention consists in the provision in an area-measuring machine of the "Sawyer" type of measuring mechanism comprising the combination with a circumferentially grooved feed or transport roller of a series of pin wheels which take the place of the usual measuring wheels and which, through the medium of intermediate mechanism (such for example as spiral gearing or ratchet mechanism) transmit the measurement to a series of wheels mounted so as to always maintain a fixed relationship to the integrating system of levers with which they are connected.

The pins of the measuring wheels are located at definite intervals around the circumference of the wheels and the latter are arranged to have a free rising and falling movement independently of the wheels which receive the measurement therefrom. The measurement is transmitted to the intermediate mechanism by the pins on the pin wheels and these are brought into engagement with said intermediate mechanism only when they come into contact with the material passing through the machine.

After the primary adjustment or setting of the parts to bring about an accurate measurement has been effected, no further adjustment is necessary and all material passed through the machine will, irrespective of its thickness, be accurately measured. That is to say, the machine will be capable of dealing with material of the thinnest possible substance such for example as tissue-paper, or it may be used to measure thick leather or other material without in any way altering the setting of the parts, and in like manner materials of irregular thickness may be passed through the machine and be accurately measured. Means are also provided by which the dial adjusting block may after being primarily set, be fastened and sealed in its adjusted position so that the accuracy of the machine cannot be interfered with by illegitimately moving said block.

The connections between the members composing the integrating system of levers is also improved to give a more delicate movement as will be hereinafter described.

In order that the invention may be clearly and readily understood it will be hereinafter described in detail, reference being made to the accompanying sheets of drawings wherein is illustrated a measuring machine embodying the improvements according to this invention.

Referring to the drawings: Figs. 1 and 2 are drawn to a smaller scale and Fig. 6 to a larger scale than Figs. 3, 4 and 5 and like parts of the machine and mechanism are designated by the same reference characters throughout the drawings.

The general characteristics of a machine constructed according to this invention are similar to those in previous constructions of machines of the "Sawyer" type that is to say, a driven feed or transport roller 1 carries the material to be measured under a series of frictionally driven measuring-wheels which latter, through intermediate mechanism, transmit movement to a system of levers.

Figure 2:
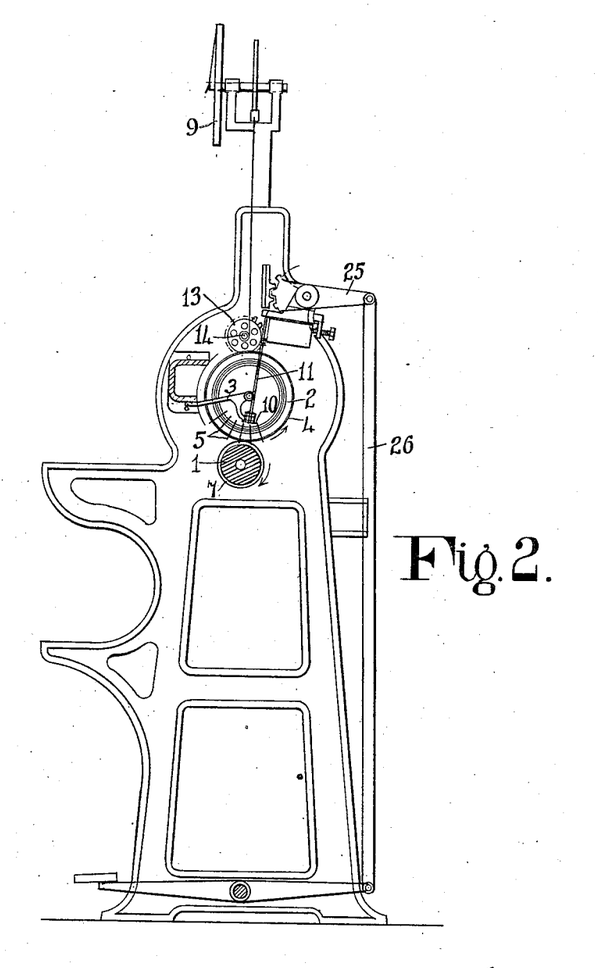
Fig. 2 is a transverse section of the machine taken on the line a—a of Fig. 1.
Figure 6:
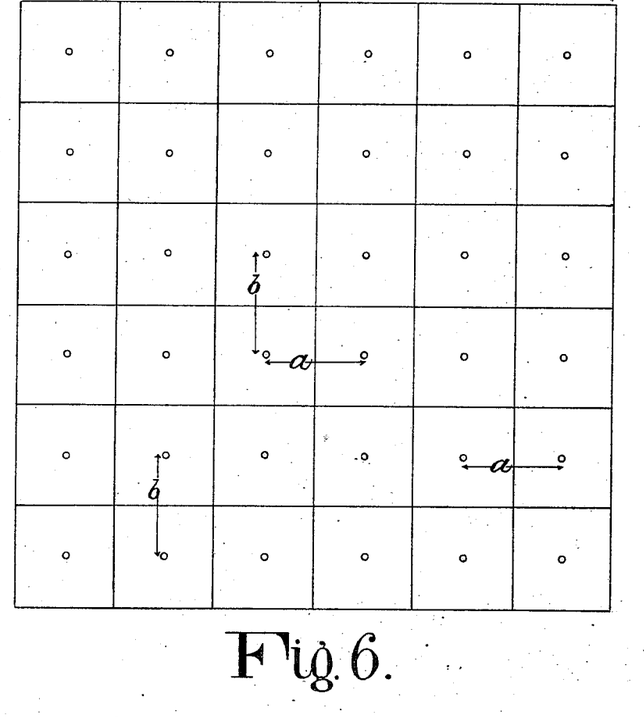
Fig. 6 is a diagrammatical view illustrating the method or system of measuring as performed by the improved machine of this invention.

The important improvement according to this invention lies in the measuring-wheels and their intermediate mechanism and this will now be described. The measuring-wheels 2 (Figs. 2 and 3) are, as heretofore, carried on a series of pivoted levers or arms 3 so that as the material is passed between the wheels 2 and the feed roller 1 said wheels may rise according to the thickness of material being measured. For the purpose of accurate measurement, the measuring-wheels 2 are predisposed sidewise relatively to each other and their peripheries 4 are divided so that the distances between the wheels and also the pitch or distances between the peripheral divisions of said wheels will correspond to or represent units of a known standard of measurement. For example, if the units are to be according to the English standard of one square inch, then the series of measuring-wheels will each be located one inch apart (center to center) and the circumference of each wheel will have divisions or points of measurement at one inch pitch. It is arranged that measurement of the material will only take place at the divisions in the peripheries of the measuring-wheels, that is to say, for every measuring point which passes into contact with the material the index will be moved to indicate a corresponding number of units. Assuming that the machine is set out according to the example before mentioned, then for every square inch of material which passes under the measuring-wheels the index will be moved to indicate a corresponding number of units as shown in Fig. 6 where a represents the distances between the measuring wheels 1, and b represents the pitch or distances of the peripheral divisions. In this manner the accurate measurement, based upon the totalization of a number of units each representing a known standard of measurement and shown by the squares in Fig. 6, will be the result.

It is to be understood that the invention is by no means confined to any particular standard of measurement as the machine may be set out to employ a unit of measurement which may represent any known standard or given area.

Figure 3:
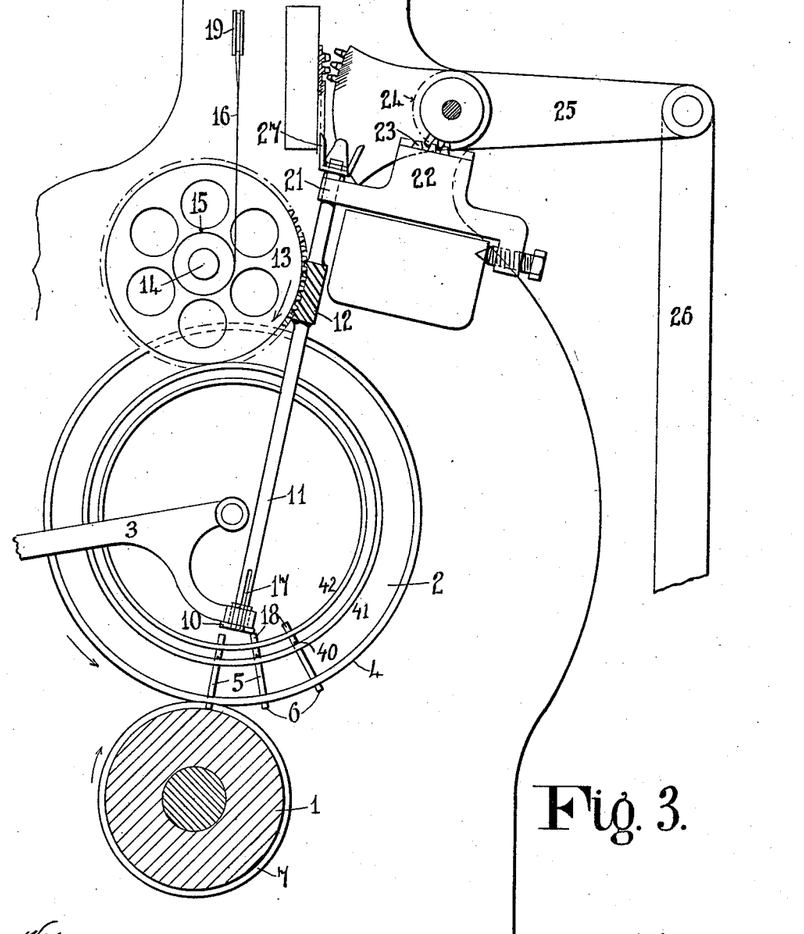
Fig. 3 is a side view of one set or section of the measuring mechanism.

The measuring or dividing points in the peripheries 4 of the measuring wheels 2 consist of pins 5 which are arranged radially in the wheels 2 (Fig. 3) and are capable of a sliding motion therein toward and from the center. The said pins 5 preferably have a free movement in the measuring-wheels 2. According to the preferred arrangement however the pins 5 are actuated by gravity and their movement is restricted by cross pins 40 or other suitable devices carried by the pins 5 and movable between concentric rings 41, 42, forming part of the measuring wheels 2, so that in one position the outward ends 6 of the pins 5 project beyond the periphery 4 of the measuring wheels 2 as shown in Fig. 3 while in the other position said ends are flush with said peripheries after the manner represented on Fig. 4. It will be obvious that at the bottom or underside of the measuring wheels 2 the pins 5 will move outward and project radially around approximately the lower half of each wheel.

The feed or transport roller 1 over which the material passes is furnished with a series of circumferential grooves or channels 7 therein (Figs. 1, 2 and 3) occupying positions in said roller which correspond to the positions of the measuring wheels 2 which rest on the top side of the said roller and are rotated by frictional contact therewith (see Fig. 3). These grooves or channels allow the radially projecting pins 5 of the measuring wheels 2 to enter therein and thus pass by or through the feed roller 1 without being depressed into the measuring-wheels, but when any material is introduced and passed between the feed roller 1 and the peripheries 4 of the measuring-wheels 2, the peripheral pins 5 of the latter will be prevented from entering and passing through the circumferential grooves 7 in the feed roller 1 and will therefore be depressed into the measuring-wheels 2 as the latter rotate over the top of the feed roller. This depression of the radial pins 5 of the measuring-wheels 2 is employed to actuate the intermediate mechanism between said wheels and the system of levers 8 (Fig. 1) which actuate the dial 9, which mechanism will now be described. The preferred form of said mechanism (Fig. 3) consists of worm gearing which operates in conjunction with each measuring-wheel 2, the depressed pins 5 of the latter being arranged to rotate a star or toothed wheel 10 on a common spindle 11 with the worm 12. The wormwheel 13 is mounted upon a fixed pivot 14 and is furnished with a drum 15 around which a flexible connection 16 with the system of levers 8 is wound when the said wormwheel 13 is rotated.

The starwheel 10 on the worm spindle 11 is movable in company with the lever or arm 3 which carries the measuring wheel 2 and for this purpose said starwheel 10 may be slidable along a feather 17 on the worm spindle 11 or be otherwise arranged to move therealong and impart rotation thereto. The said starwheel 10 may be mounted in the lever or arm 3 in any convenient manner and is so disposed with relation to the measuring wheel 2 that the inner ends 18 of those radial pins 5 which are engaged with the material being measured and depressed thereby will engage its teeth, each pin a tooth, to rotate it and the worm 12, but those pins 5 which are not depressed as they pass the feed roller 1 will miss said starwheel 10. The connection 16 between the drum 15 of the wormwheel 13 and one of the pulleys 19 on the system of levers 8 preferably consists of a steel band or wire but if found necessary, a chain as heretofore may be employed.

The inner ends 18 of all the pins 5 in the measuring-wheels 2 which are depressed by the material passing between said wheels and the feed roller 1, will, as they pass the starwheels 10 rack the latter around and thus cause a rotation of the wormwheels 13 which, by winding up the flexible connections 16 pull down the integrating levers 8 which in turn actuate the index. The amount of rotation imparted to a wormwheel 13 by the engagement of one pin 5 with the corresponding starwheel 10 is arranged to actuate the index so that one unit is indicated on the dial 9.

Owing to the fact that the starwheel 10 of each measuring-wheel 2 moves in company therewith when the latter is raised by the thickness of the material passing thereunder, and that the wormwheel 13 which actuates the dial levers 8, although being rotated by, does not move up and down with, the starwheel 10, it will be seen that the rising and falling of the measuring wheel 2 will not affect the accurate measurement of the material irrespective of the thickness of the latter.

In order that the wormwheels 13 may be returned to zero position after they have been advanced to actuate the index, the worm 12 of each wormwheel 13 is preferably arranged so that it may be moved out of gear with its wheel 13 to free the latter, which thereupon is rotated in the opposite direction in any suitable or known manner as by the upward pull of the system of levers 8 imparted by the indicator counterweight 20 or spring. A suitable stop (not shown) is provided in a manner well understood in conjunction with the wormwheels 13 to limit their return movement.

In order that the series of wormwheels 13 may be released simultaneously for the purpose just mentioned, the bearings 21 which carry the worm spindles 11 at the end nearest the wormwheels, may be attached to a common rod or bar 22, which latter is arranged to rock or swing for the purpose of moving each worm 12 out of gear from its wormwheel 13. Any suitable devices such for example as a rack 23, pinion 24, lever 25 and link 26 (Fig. 3) actuated by the hand or foot of the operator, may be brought into requisition for the purpose of moving the rocking bar 22, and the upper end of each worm spindle 11 is preferably furnished with a toothed wheel 27 thereon which, when the said spindle 11 is moved away from the wormwheel 13 will be held against rotation in any suitable manner to insure that the worm 12 will retain or assume its proper position to enter the teeth of the wormwheel 13 when the worm is again moved into gear therewith.

Figures 4, 5:
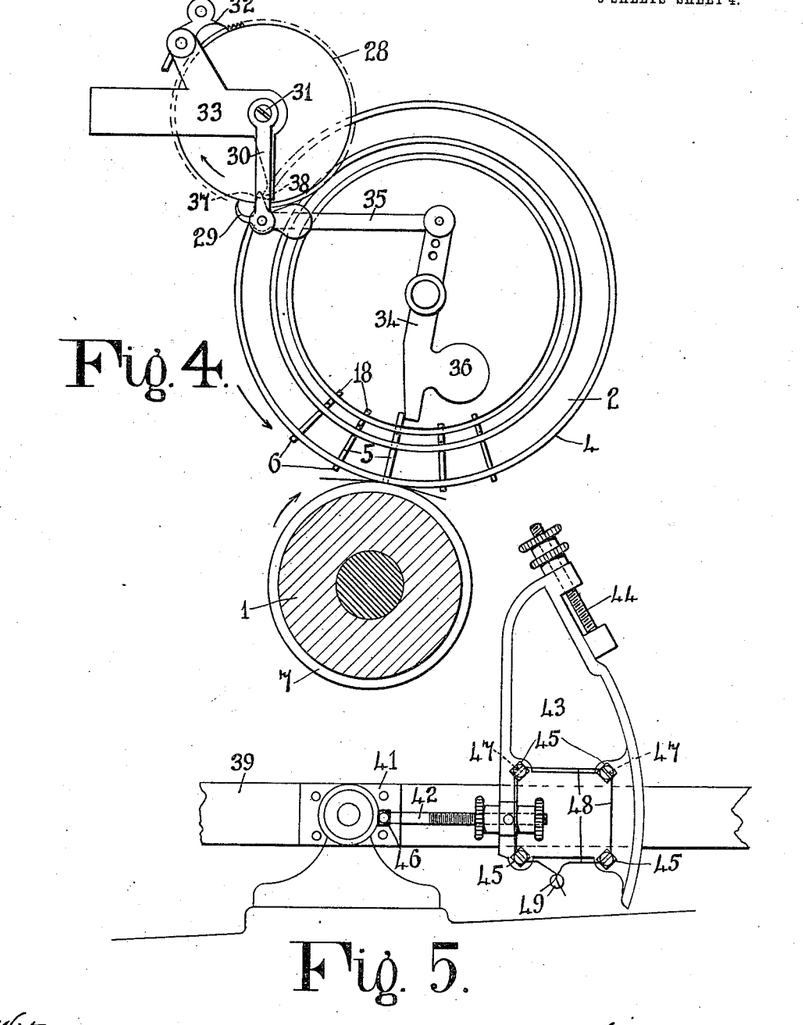
Fig. 4 is a similar view to the previous figure and shows a modified form of the measuring mechanism.
Fig. 5 is a front elevation of the improved construction of dial adjusting block.

An alternative arrangement of mechanism for transmitting measuring movement from the radial pins 5 of the measuring-wheels 2 to the indicator levers 8 is shown in Fig. 4 and may consist of a ratchet wheel 28, which is arranged and operates in the same manner as the before mentioned wormwheel 13. The said ratchet wheel 28 is racked around by means of a pawl 29 pivoted on the end of a swinging arm 30 fulcrumed on the axis 31 of the ratchet wheel. The pawl 29 is counterweighted or has a suitable spring combined therewith to carry it into engagement with the teeth of the ratchet wheel 28, and a pivoted detent 32 carried by a fixed bracket 33 also engages the ratchet wheel 28 to prevent backward movement of the latter.

The pawl arm 30 is rocked to rack around the ratchet wheel 28 from a lever 34 which is fulcrumed on the axis of the measuring-wheel 2. The upper end of this lever 34 is coupled by a link 35 to the pawl arm 30, and the lower end of said lever 34 is suitably shaped to be engaged by the inner ends 18 of the peripheral pins 5 of the measuring-wheel 2 when they are depressed. Each depressed pin 5 as it passes the dependent end of the lever 34 carries the latter forward until the pins 5 move radially outward in the measuring wheel 2 and thus clear the lever 34 whereupon the latter swings back under the influence of suitable means, which is herein shown as a weight 36.

The pawl 29 which racks around the ratchet wheel 28 is furnished with a finger 37 or is otherwise arranged to engage a fixed part 38 of a frame or the bracket 33, so that when the pawl arm 30 has returned after racking the ratchet wheel 28 forward in the direction indicated by the arrow, the pawl 29 will be moved clear of said wheel 28 and thus all the ratchet wheels will be free to return to the zero position when their back-stop detents 32 are raised. The series of back-stop detents 32 may be raised simultaneously by any suitable means. Immediately the pawl arm 30 swings forward, the pawl 29 moves into engagement with the ratchet wheel 28.

The steel bands or equivalent flexible means 16 which connect the wormwheels 13 or ratchet wheels 28 with the integrating system of levers 8 are passed around pulleys 19 on the ends of the levers in the same manner as in other machines of the type referred to. According to the present invention however, the said levers 3 are pivoted together by means of knife edge joints in a similar manner to scale levers, the purpose of this being to reduce friction at the joints and insure a more delicate movement and accurate measurement.

Figure 1:
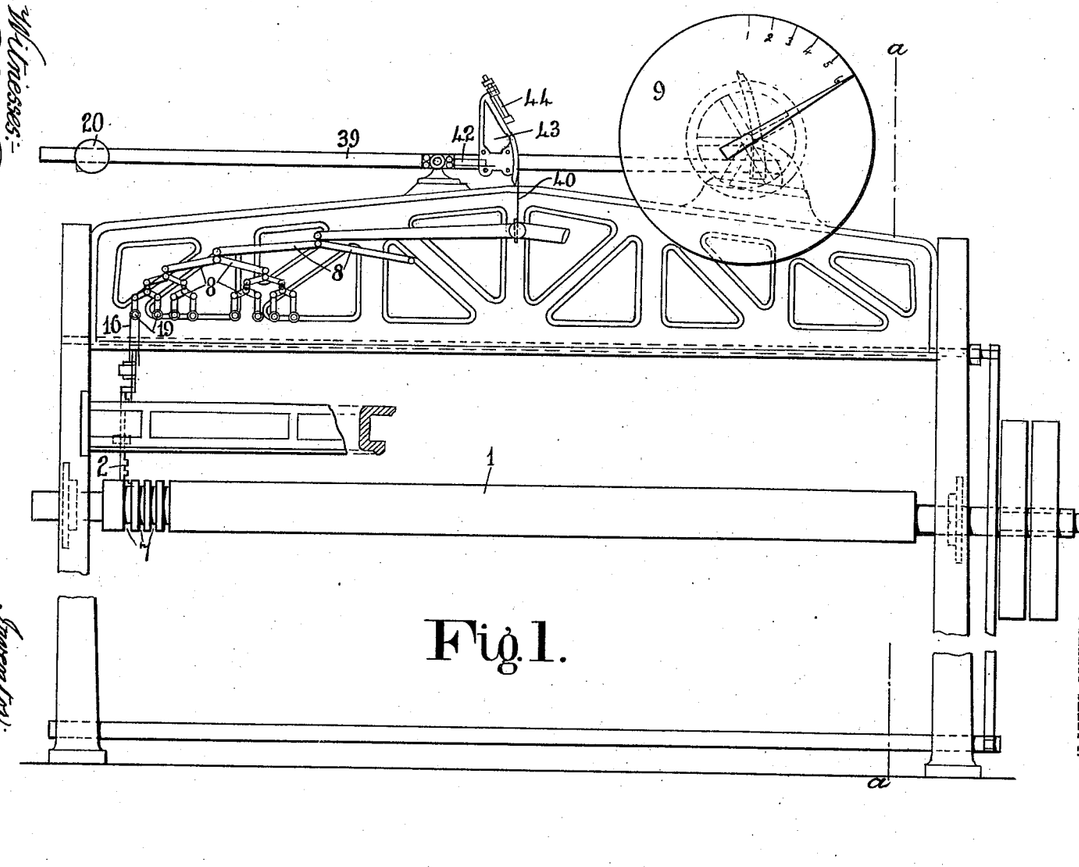
—Figure 1 is a front elevation of the machine only one set of measuring mechanism and a portion of the integrating system of levers being shown.

For the purpose of preventing illegitimate interference with the adjusting means of the machine after they have been once set, the bar or lever 39 which actuates the index, and to which the last lever of the integrating system is connected by a chain or band 40 as shown in Fig. 1, is furnished with a permanently fixed block 41 thereon. In this block 41 is located the head of a micrometer screw 42, which latter is threaded into the adjustable slide 43 on said bar 39 to which the integrating levers 8 are attached by the usual adjustable means 44.

By means of the micrometer screw 42 the slide 43 is adjusted along the bar or lever 39 until the machine gives accurate measurement. After being set, the slide 43 is fastened in its adjusted position on the bar 39 by means of a number of set screws 45 provided in the side of said slide 43, and the head of the micrometer screw 42 is locked from rotation by a set-screw 46 in the fixed block 41. The locking set screws 45 of the slide 43 are furnished with holes 47 through the heads thereof in order that a wire, cord or equivalent 48 may be passed through all the set screws 45 the ends of said wire 48 being secured and sealed at 49 in any well known manner so that the set screws 45 cannot be slackened to interfere with the adjustment of the slide 43 without first breaking the seal 49.

What I claim then is:—

1. An area-measuring machine of the type herein referred to provided with, in combination, a circumferentially grooved transport roller, a series of rotary measuring wheels, a series of pins radially slidable in each measuring wheel and arranged to be actuated by the passage of material between the transport roller and measuring wheels, the transport roller and measuring wheels, and a device to indicate the measurement and means arranged to be operated by the actuated pins and to transmit movement to the said measurement indicating device.

2. An area-measuring machine of the type herein referred to provided with a circumferentially grooved transport roller, and, in combination therewith, measuring mechanism consisting of a series of friction driven rotary measuring wheels arranged to yield to the varying thicknesses of material passed thereunder, a series of pins radially slidable in each measuring wheel and adapted to be actuated by the material to be measured, a series of unyielding wheels adapted to actuate the measurement indicating device, and intermediate means arranged to be operated by the actuated pins of the measuring wheels and to transmit movement to the unyielding wheels for the purpose described.

3. An area-measuring machine of the type herein referred to provided with a circumferentially grooved transport roller, a series of rotary measuring wheels, a series of pins radially slidable in each measuring wheel, and intermediate mechanism adapted to be actuated by said pins to move the indicating device, said pins being arranged to actuate said intermediate mechanism only when in contact with material passed between the transport roller and measuring wheels, for the purpose described.

4. An area-measuring machine of the type herein referred to provided with a circumferentially grooved transport roller, a series of rotary measuring wheels arranged to yield to varying thicknesses of material passed thereunder, a series of radially movable pins in each measuring wheel, a series of unyielding wheels adapted to actuate the measurement indicating device and intermediate means adapted when actuated by the pins to transmit movement to the unyielding wheels, said means being arranged to move bodily in company with the yielding measuring wheels without imparting movement to the unyielding wheels, for the purpose described.

5. An area-measuring machine of the type herein referred to provided with measuring mechanism consisting of a circumferentially grooved transport roller, a series of rotary measuring wheels, pivoted arms to carry said measuring wheels, a series of pins radially slidable in each measuring wheel arranged to normally project into and pass through the grooves in the roller, means carried by the pivoted arms and arranged to be normally clear of the sliding pins but to be engaged and moved by said pins when the latter are actuated by material passed under the measuring wheel, a series of totalizing wheels mounted upon fixed axes and connected to the integrating system of indicator levers and means to transmit the movement to the totalizing wheels from the aforesaid means which are actuated by the pins of the measuring wheels, substantially as described.

6. In an area-measuring machine of the kind herein described, in combination, a grooved transport roller, a series of friction driven pin wheels, pivoted arms carrying said pin wheels, a series of totalizing wheels, and intermediate mechanism between the pin wheels and the totalizing wheels consisting of spiral gearing to rotate each totalizing wheel, and a starwheel slidable on the spindle of the spiral gearing and carried by the pivoted arm supporting the pin wheel, said starwheel being arranged to be engaged and rotated by the actuated pins in the pin wheel, substantially as and for the purpose described.

7. In an area-measuring machine of the kind herein described, in combination, a grooved transport roller, a series of friction driven pin wheels, pivoted arms carrying said pin wheels, a series of totalizing wheels, intermediate mechanism between the pin wheels and the totalizing wheels consisting of spiral gearing to rotate each totalizing wheel, and a starwheel slidable on the spindle of the spiral gearing and carried by the pivoted arm supporting the pin wheel said starwheel being arranged to be engaged and rotated by the actuated pins in the pin wheel, means to disengage the spiral gears from the totalizing wheels, and means to correctly position said spiral gears prior to their reëngagement with the totalizing wheels, substantially as and for the purpose described.

8. In an area-measuring machine of the kind herein described, in combination, a grooved transport roller, a series of friction driven pin wheels, pivoted arms carrying said pin wheels, a series of totalizing wheels, intermediate mechanism between the pin wheels and the totalizing wheels consisting of spiral gearing to rotate each totalizing wheel, and a starwheel slidable on the spindle of the spiral gearing and carried by the pivoted arm supporting the pin wheel said starwheel being arranged to be engaged and rotated by the actuated pins in the pin wheel, a series of bearings mounted on a movable bar and mechanism for actuating the same to disengage the spiral gears from the totalizing wheels, and means to correctly position said gears relatively to and prior to their reëngagement with the totalizing wheels, substantially as and for the purpose described.

9. An area-measuring machine of the type herein referred to provided with, in combination, a transport roller, a series of rotary measuring wheels, a series of pins radially slidable in each measuring wheel and arranged to be actuated by the passage of material between the transport roller and measuring wheels, a device to indicate the measurement, and means arranged to be operated by the actuated pins and to transmit movement to the said measurement indicating device.

In testimony whereof I have signed my name to this specification in the presence of two subscribing witnesses.

GUSTAV ADOLF SCHETTLER.

Witnesses:
WALTER W. BALL,
GEORGE LESTER.

Copies of this patent may be obtained for five cents each, by addressing the "Commissioner of Patents, Washington, D. C."